United States Patent
Neelagiri et al.

(10) Patent No.: US 12,367,872 B2
(45) Date of Patent: Jul. 22, 2025

(54) PERSONALIZED MULTI-MODAL SPOKEN LANGUAGE IDENTIFICATION

(71) Applicant: Samsung Electronics Co., Ltd., Suwon-si (KR)

(72) Inventors: Divya Neelagiri, Dublin, CA (US); Cindy Sushen Tseng, Santa Clara, CA (US); Vijendra Raj Apsingekar, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 17/937,692

(22) Filed: Oct. 3, 2022

(65) Prior Publication Data

US 2023/0419958 A1 Dec. 28, 2023

Related U.S. Application Data

(60) Provisional application No. 63/355,960, filed on Jun. 27, 2022.

(51) Int. Cl.
G10L 15/197 (2013.01)
G10L 15/00 (2013.01)
G10L 15/22 (2006.01)

(52) U.S. Cl.
CPC .......... G10L 15/197 (2013.01); G10L 15/005 (2013.01); G10L 15/22 (2013.01)

(58) Field of Classification Search
CPC ...... G10L 15/197; G10L 15/005; G10L 15/22
See application file for complete search history.

(56) References Cited

U.S. PATENT DOCUMENTS

| | | | |
|---|---|---|---|
| 9,189,742 B2 | 11/2015 | London | |
| 9,535,896 B2 * | 1/2017 | Bojja | G06F 40/263 |
| 10,679,615 B2 | 6/2020 | Chao et al. | |
| 2007/0157216 A1 | 7/2007 | Maes | |

(Continued)

FOREIGN PATENT DOCUMENTS

| | | |
|---|---|---|
| CN | 106503156 A | 3/2017 |
| CN | 107292696 A | 10/2017 |

(Continued)

OTHER PUBLICATIONS

"Toward Multi-Modal Understanding and Multi-Modal Intelligence," SyncedReview, Nov. 2017, 11 pages.

(Continued)

*Primary Examiner* — Stella L. Woo

(57) ABSTRACT

A method includes obtaining an audio input of a person speaking, where the audio input is captured by an electronic device. The method also includes, for each of multiple language types, (i) determining a first probability that the person is speaking in the language type by applying a trained spoken language identification model to the audio input, (ii) determining at least one second probability that the person is speaking in the language type based on at least one characteristic of the person or the electronic device, and (iii) determining a score for the language type based on a weighted sum of the first and second probabilities. The method further includes identifying the language type associated with a highest score as a spoken language of the person in the audio input.

20 Claims, 3 Drawing Sheets

(56) References Cited

U.S. PATENT DOCUMENTS

| | | | |
|---|---|---|---|
| 2011/0093271 | A1 | 4/2011 | Bernard |
| 2012/0010886 | A1* | 1/2012 | Razavilar ............. G10L 15/005 |
| | | | 704/E17.001 |
| 2012/0245944 | A1 | 9/2012 | Gruber et al. |
| 2014/0035823 | A1 | 2/2014 | Khoe et al. |
| 2015/0364129 | A1* | 12/2015 | Gonzalez-Dominguez ................. |
| | | | G10L 15/005 |
| | | | 704/251 |
| 2016/0267070 | A1 | 9/2016 | Bojja et al. |
| 2016/0379106 | A1 | 12/2016 | Qi et al. |
| 2017/0011734 | A1 | 1/2017 | Ganapathy et al. |
| 2019/0073358 | A1 | 3/2019 | Du et al. |
| 2019/0095430 | A1 | 3/2019 | Smus et al. |
| 2019/0355345 | A1 | 11/2019 | Fu |
| 2020/0219492 | A1 | 7/2020 | Apsingekar et al. |
| 2020/0335083 | A1* | 10/2020 | Wan ....................... G06N 3/044 |
| 2020/0342033 | A1 | 10/2020 | Sreedhara |
| 2020/0357391 | A1 | 11/2020 | Ghoshal et al. |
| 2021/0233517 | A1 | 7/2021 | Gong et al. |
| 2022/0013107 | A1* | 1/2022 | Wintrode ................ G10L 15/08 |
| 2022/0092276 | A1 | 3/2022 | Tu et al. |
| 2022/0189457 | A1* | 6/2022 | Shen ..................... G10L 15/005 |
| 2023/0353399 | A1* | 11/2023 | Hannun .................. G06F 40/58 |
| 2024/0087752 | A1* | 3/2024 | Rutowski ............. A61B 5/7275 |

FOREIGN PATENT DOCUMENTS

| | | |
|---|---|---|
| CN | 108108340 A | 6/2018 |
| CN | 108959520 A | 12/2018 |
| CN | 112017630 A | 12/2020 |
| CN | 113597641 A | 11/2021 |
| EP | 1909263 B1 | 1/2009 |
| EP | 3109800 A1 | 12/2016 |
| EP | 2761860 B1 | 10/2019 |
| EP | 3567583 B1 | 12/2020 |

OTHER PUBLICATIONS

Aytar et al., "See, Hear, and Read: Deep Aligned Representations," Computer Vision and Pattern Recognition, Jun. 2017, 9 pages.

Krizhevsky et al., "ImageNet Classification with Deep Convolutional Neural Networks," Communications of the ACM, vol. 60, No. 6, Jun. 2017, 7 pages.

Kaiser et al., "One Model To Learn Them All," Google Brain, Jun. 2017, 10 pages.

Szegedy et al., "Inception-v4, Inception-ResNet and the Impact of Residual Connections on Learning," Computer Vision and Pattern Recognition, Aug. 2016, 12 pages.

Shazeer et al., "Outrageously Large Neural Networks: The Sparsely-Gated Mixture-Of-Experts Layer," ICLR 2017, Jan. 2017, 19 pages.

Hristov et al., "Grounding Symbols in Multi-Modal Instructions," First Workshop on Language Grounding for Robotics, Jun. 2017, 9 pages.

Rothkopf et al., "Task and context determine where you look," Journal of Vision, Dec. 2007, 20 pages.

Zhong et al., "Sensorimotor Input as a Language Generalisation Tool," Robotics, Computation and Language, May 2016, 23 pages.

Baltrusaitis et al., "Multimodal Machine Learning: A Survey and Taxonomy," Machine Learning, Aug. 2017, 20 pages.

Wikipedia, "Multimodal interaction," Jun. 2022, 10 pages.

"Multimodal interaction-versatile AI for situational driving—Go beyond voice with the most intuitive interaction available," Nuance Communications, Inc., 2018, 6 pages.

"Nuance Advances Text-to-Speech Technology through Deep Learning," Nuance Communications, Inc., Feb. 2018, 2 pages.

"Artificial Intelligence in the car: from the telephone operator to the virtual assistant," Nuance Communications, Inc., Apr. 2018, 3 pages.

Dahlberg, "Multimodality and the future of Personal Assistants," Arcada, Master's Thesis, Media Management, 2015, 36 pages.

Kinsella, "Google Assistant on Smartphones Gets Update for Multimodal Interaction and Image and Gif Displays—Voicebot.ai," Oct. 2018, 7 pages.

Bajorek, "Voice First Versus the Multimodal User Interfaces of the Future," UXmatters, Oct. 2018, 13 pages.

Këpuska et al., "Next-Generation of Virtual Personal Assistants (Microsoft Cortana, Apple Siri, Amazon Alexa and Google Home)," 8th IEEE Annual Computing and Communication Workshop and Conference, Jan. 2018, 5 pages.

International Search Report and Written Opinion of the International Searching Authority dated Aug. 24, 2023 in connection with International Patent Application No. PCT/KR2023/007059, 11 pages.

Supplementary European Search Report dated Mar. 28, 2025 in connection with European Patent Application No. 23831738.2, 10 pages.

* cited by examiner

PERSONALIZED MULTI-MODAL SPOKEN LANGUAGE IDENTIFICATION

CROSS-REFERENCE TO RELATED APPLICATION AND PRIORITY CLAIM

This application claims priority under 35 U.S.C. § 119(e) to U.S. Provisional Patent Application No. 63/355,960 filed on Jun. 27, 2022. This provisional application is hereby incorporated by reference in its entirety.

TECHNICAL FIELD

This disclosure relates generally to machine learning systems. More specifically, this disclosure relates to personalized multi-modal spoken language identification.

BACKGROUND

Spoken language identification refers to the process of identifying the language being spoken by a speaker. Spoken language identification is an important area in speech signal processing and other fields and has wide applications in a number of possible areas. For example, the ability to recognize the language being spoken by a particular person can enable a number of automated functions to be performed based on what that person says. The performance of these automated functions often depends on the ability to successfully understand what is being said.

SUMMARY

This disclosure relates to personalized multi-modal spoken language identification.

In a first embodiment, a method includes obtaining an audio input of a person speaking, where the audio input is captured by an electronic device. The method also includes, for each of multiple language types, (i) determining a first probability that the person is speaking in the language type by applying a trained spoken language identification model to the audio input, (ii) determining at least one second probability that the person is speaking in the language type based on at least one characteristic of the person or the electronic device, and (iii) determining a score for the language type based on a weighted sum of the first and second probabilities. The method further includes identifying the language type associated with a highest score as a spoken language of the person in the audio input.

In a second embodiment, an apparatus includes at least one processing device configured to obtain an audio input of a person speaking captured by an electronic device. The at least one processing device is also configured, for each of multiple language types, to (i) determine a first probability that the person is speaking in the language type by applying a trained spoken language identification model to the audio input, (ii) determine at least one second probability that the person is speaking in the language type based on at least one characteristic of the person or the electronic device, and (iii) determine a score for the language type based on a weighted sum of the first and second probabilities. The at least one processing device is further configured to identify the language type associated with a highest score as a spoken language of the person in the audio input.

In a third embodiment, a non-transitory computer readable medium contains instructions that when executed cause at least one processor to obtain an audio input of a person speaking captured by an electronic device. The medium also contains instructions that when executed cause the at least one processor, for each of multiple language types, to (i) determine a first probability that the person is speaking in the language type by applying a trained spoken language identification model to the audio input, (ii) determine at least one second probability that the person is speaking in the language type based on at least one characteristic of the person or the electronic device, and (iii) determine a score for the language type based on a weighted sum of the first and second probabilities. The medium further contains instructions that when executed cause the at least one processor to identify the language type associated with a highest score as a spoken language of the person in the audio input.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another.

For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
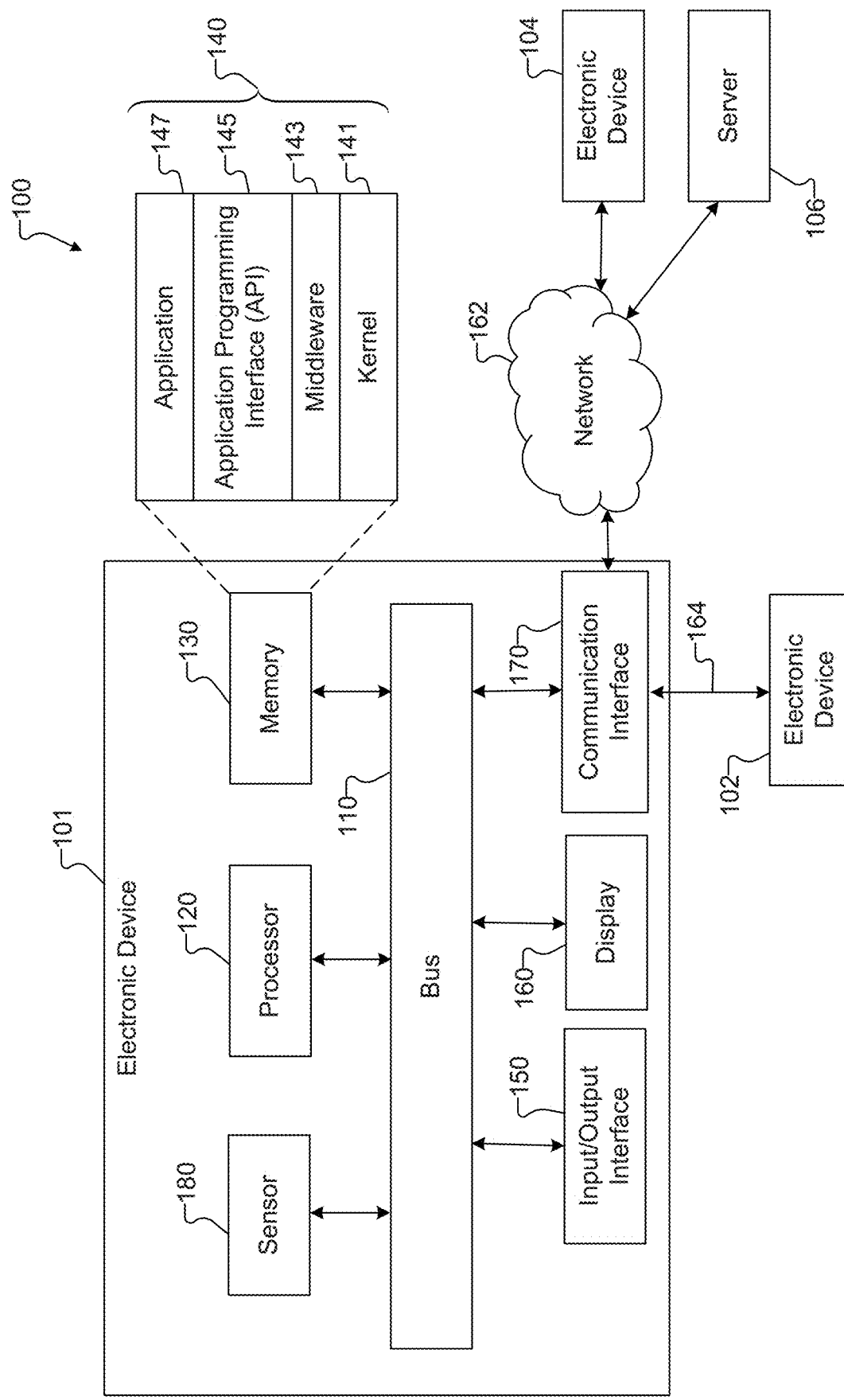
FIG. 1 illustrates an example network configuration including an electronic device in accordance with this disclosure.
Figure 2:
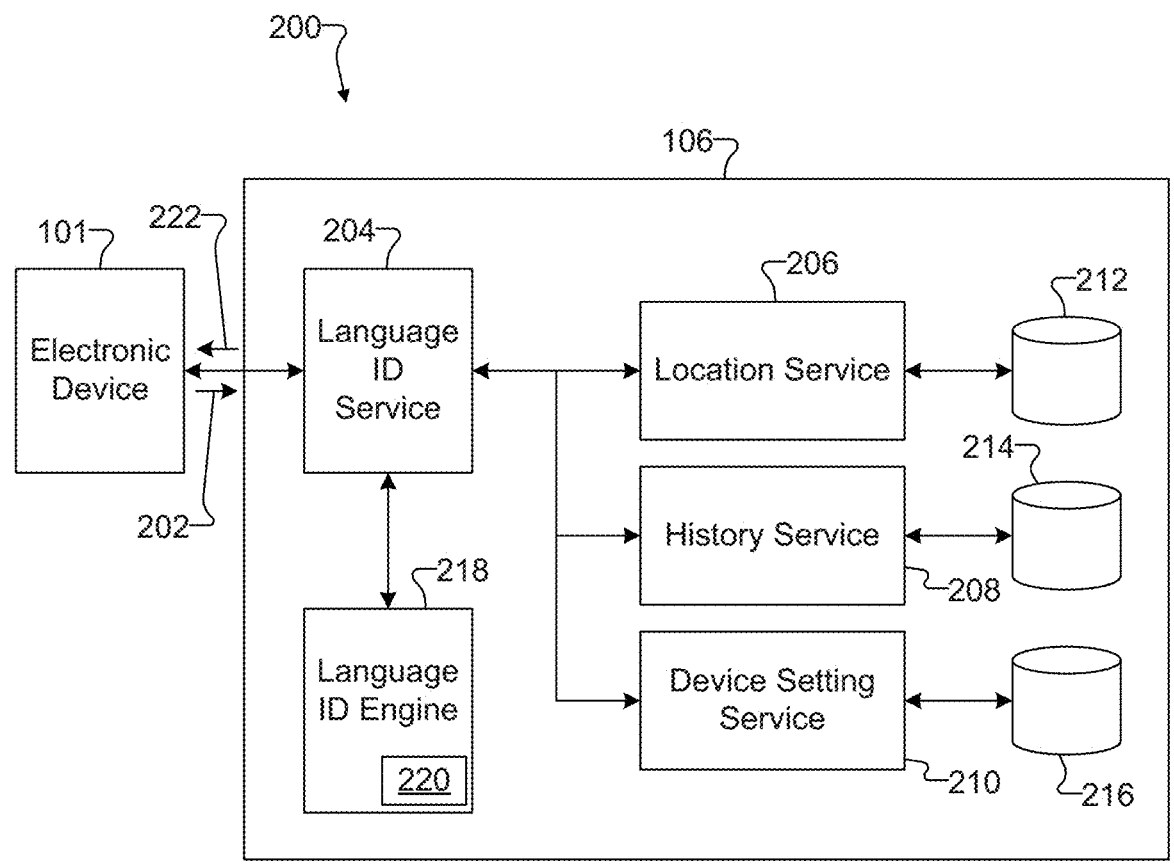
FIG. 2 illustrates an example architecture for personalized multi-modal spoken language identification in accordance with this disclosure.
Figure 3:
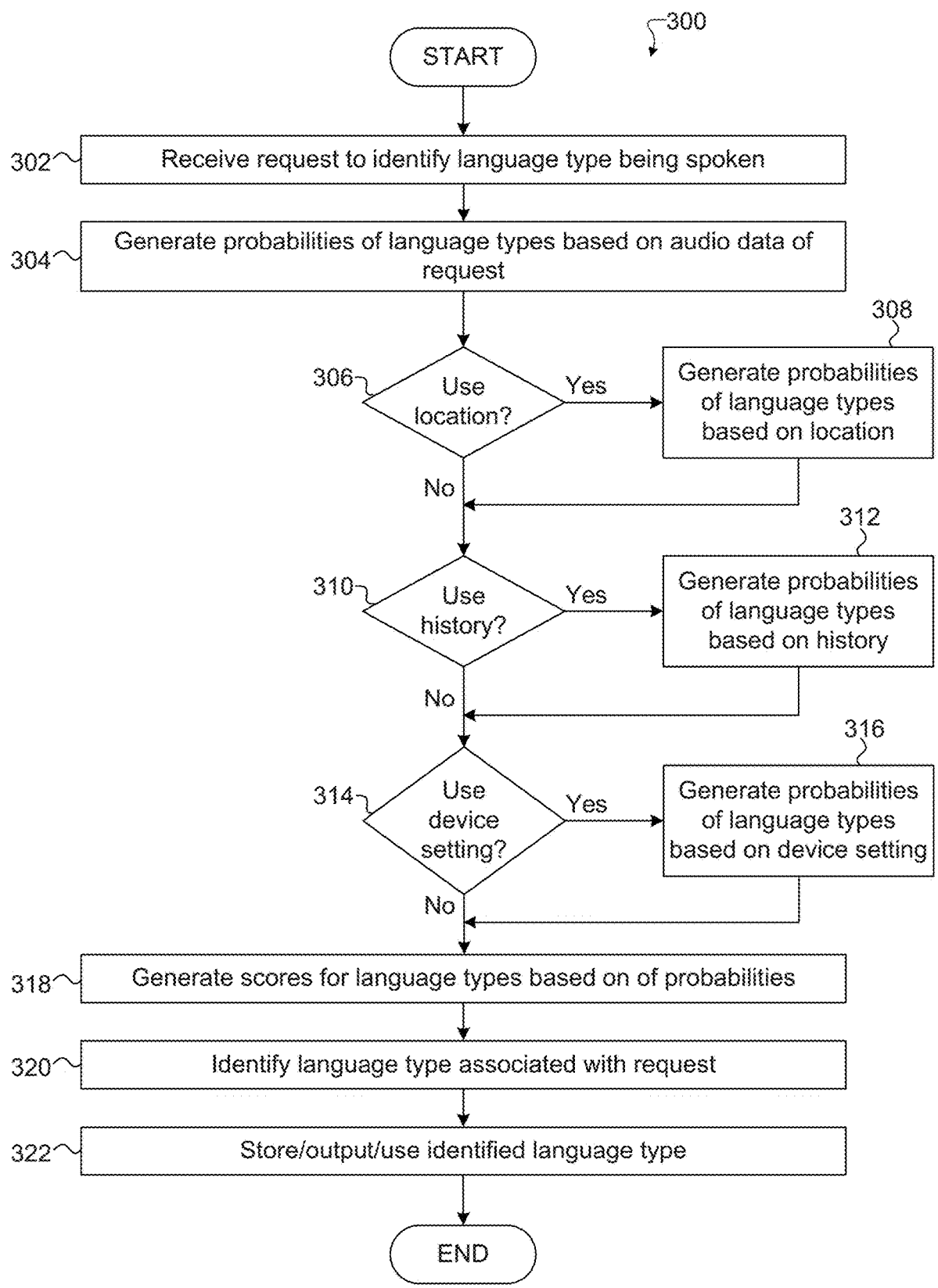
FIG. 3 illustrates an example method for personalized multi-modal spoken language identification in accordance with this disclosure.

FIGS. 1 through 3, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, spoken language identification refers to the process of identifying the language being spoken by a speaker. Spoken language identification is an important area in speech signal processing and other fields and has wide applications in a number of possible areas. For example, the ability to recognize the language being spoken by a particular person can enable a number of automated functions to be performed based on what that person says. The performance of these automated functions often depends on the ability to successfully understand what is being said.

Some approaches simply ask a user to identify the language that will be spoken by the user, which is typically inconvenient for the user and can limit the usage of the system. Other approaches attempt to automatically determine the language being spoken based on a person's speech. However, these prior approaches generally rely only on a person's speech to determine the language being spoken. This can be problematic in various situations, such as when audio data captures only short-duration speech or when the language being spoken is associated with limited speech data. In these cases, it is common for a language identification system to incorrectly identify the language being spoken, which can lead to improper or incorrect processing of the audio data.

This disclosure provides various techniques for personalized multi-modal spoken language identification. As described in more detail below, an audio input of a person speaking is obtained, where the audio input is captured by an electronic device. The electronic device may, for instance, represent a mobile electronic device or other electronic device being used by the person or another electronic device. For each language type, a first probability that the person is speaking in the language type is determined by applying a trained spoken language identification model to the audio input. Also, for each language type, at least one second probability that the person is speaking in the language type is determined based on at least one characteristic of the person or the electronic device. A score for each language type is determined based on a weighted sum of the first and second probabilities for that language type, and the language type associated with a highest score is identified as the spoken language of the person.

The at least one characteristic may include one or multiple characteristics of the person or one or multiple characteristics of the electronic device. In some cases, for example, the at least one characteristic may include a location associated with the person, such as a location as determined by the electronic device. As a particular example, a location associated with the person or the electronic device can be used to identify statistics of spoken language types in the city, state/province, country, or other region of the location, and the statistics can be used to help identify which language type or types are more likely to be spoken at that location. Also or alternatively, the at least one characteristic may include a history of spoken language types associated with the person or the electronic device, such as any spoken language types previously identified for the person. Also or alternatively, the at least one characteristic may include a keyboard language setting or a browser language setting of the electronic device, such as the language that the person selected when installing or otherwise configuring the electronic device or an app on the electronic device.

In this way, at least one characteristic of the person or the electronic device can be used to help personalize language identification functionality and improve the accuracy of the language identification functionality. The use of at least one characteristic of the person or the electronic device can help to boost a language identification system's accuracy when speech data alone is insufficient, such as when the audio data being analyzed is short. Also, these techniques provide for the usage of multimodal features during language identification, meaning these techniques can consider both (i) audio data of a person that is being processed and (ii) one or more characteristics, at least one of which may be unrelated to the audio data itself. In some cases, this can be accomplished using a common spoken language identification model that has been trained to identify multiple spoken language types, without the need to retrain the spoken language identification model for each person. Further, the at least one characteristic of the person or the electronic device is often readily available on the electronic device, so consideration of the at least one characteristic can be implemented in a straightforward manner. If any characteristic of the person or the electronic device is unavailable, the language identification functionality may use the characteristic or characteristics that are available, or the language identification functionality may default to using a standard language identification process. In addition, these techniques allow for shallow fusions of determined probabilities when identifying language types being spoken, which can result in extremely lightweight implementations.

Note that the term "metadata" may be used in this document to refer to at least one characteristic of the person or the electronic device (such as the location of the person or electronic device, the language history of the person or electronic device, the keyboard language setting or browser language setting of the electronic device, or any combination thereof) or information based on the at least one characteristic of the person or the electronic device. Also note that the phrase "language type" is used in this document to distinguish between different languages and to distinguish between different dialects or other variations within a common language. Thus, for instance, the described techniques may be used with different languages or with different dialects of the same language, such as different dialects used in different countries or in different regions of the same country.

In addition, note that the language identification functionality described in this document may be used independently or as part of any larger application or system. For example, multilingual speech recognition models represent machine learning models that are trained to convert spoken words (which can be in multiple language types) into text. Translation applications can be used to convert words spoken in one language into text or audio in a different language. Call routing applications can be used to automatically route callers to appropriate personnel based on the language types spoken by the callers. Live transcription applications can be used to automatically transcribe what one or more people are saying in real-time. Dictation and memo applications can be used to automatically convert spoken words into text for email, messaging, note, or other uses. All of these example applications can rely on the accurate identification of a language being spoken in order to perform their described functionalities correctly. Of course, the language identification functionality described in this document may be used in any other suitable manner.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described below, the processor 120 may be used to perform or support personalized multi-modal spoken language identification.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications related to performing or supporting personalized multi-modal spoken language identification. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to perform or support personalized multi-modal spoken language identification Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

FIG. 2 illustrates an example architecture 200 for personalized multi-modal spoken language identification in accordance with this disclosure. For ease of explanation, the architecture 200 of FIG. 2 is described as involving the use of the server 106 and the electronic device 101 in the network configuration 100 of FIG. 1. However, the architecture 200 may involve the use of any other suitable device(s) in any other suitable system(s).

As shown in FIG. 2, the electronic device 101 provides a request 202 to the server 106. The request 202 represents a language identification (LID) request, which represents a request asking the server 106 to identify the language type(s) being spoken by at least one person, such as a user of the electronic device 101. The LID request can include any suitable content, such as audio data captured by the electronic device 101 and any metadata available at the electronic device 101. The audio data may, for instance, include audio data captured by at least one microphone (at least one sensor 180) of the electronic device 101. As noted above, at least some of the metadata represents information that is unrelated to the audio data captured by the electronic device 101. The metadata includes one or more characteristics of the person speaking or the electronic device 101, such as the location of the person or electronic device 101, the language history of the person or electronic device 101, the keyboard language setting or browser language setting of the electronic device 101, or a combination thereof.

The server 106 in this example provides an LID service 204, which can receive the request 202 from the electronic device 101 and provide one or more identified language types to the electronic device 101 based on the request 202. In this example, the LID service 204 can route different metadata from the request 202 to different services 206-210, where the different services 206-210 can access different databases 212-216 of information in order to provide language identification-based assistance.

As shown in FIG. 2, the LID service 204 can provide a real-time location associated with a person or electronic device 101, such as a location of the electronic device 101 as determined by a positioning system of the electronic device 101, to a location service 206. The location service 206 uses the location of the person or electronic device 101 to estimate which language type or language types might be spoken by the person based on the location. As a particular example, the location service 206 can be used to access a geo-language database 212, which can store statistics or other information regarding spoken language types in different cities, states/provinces, countries, or other regions. Thus, for instance, the geo-language database 212 might indicate that each of different regions has a certain percentage of people who speak a first language type, another percentage of people who speak a second language type, another percentage of people who speak a third language type, and so on. The location service 206 can use the real-time location of the person or electronic device 101 to identify statistics for the language types used in the region that includes the real-time location. The location service 206 may return metadata that includes an identification of each of those language types along with other information like the associated percentage (probability) of people who speak that language type in the region that includes the real-time location.

The LID service 204 can also or alternatively provide an identification of the person or the electronic device 101 to a history service 208. The history service 208 uses the identification of the person or the electronic device 101 in order to identify a history of spoken language types previously associated with the person or the electronic device 101, such as any spoken language types previously identified for the person or the electronic device 101. The history of spoken language types may also identify how often different language types have been previously identified for the person or the electronic device 101. The language history here can provide probabilities of different language types being spoken based on the person or electronic device's prior history. In some embodiments, the language history associated with a particular person or electronic device 101 is modeled using a model that has been trained based on Mel frequency cepstral coefficients, linear prediction cepstral coefficients (representing vocal cord movements), wavelet octave coefficients of residues (representing pitch, harmonic structure, and spectral energy distribution), or a combination thereof. The model here can be trained to identify a language type being spoken based on these characteristic(s) in audio data, and the model can return different probabilities that a person is speaking different language types. Models or other information related to histories can be stored in a history database 214 for use by the history service 208. The history service 208 may return metadata that includes one or more probabilities of one or more language types based on the person or electronic device's history.

The LID service 204 can also or alternatively provide an identification of the person or the electronic device 101 to a device setting service 210. The device setting service 210 uses one or more language settings for a keyboard, browser, or other app or other feature of the electronic device 101 in order to identify one or more language types that have been selected for use. Depending on the implementation and the circumstances, in some cases, a user of the electronic device 101 may select a single language type for use with a keyboard, browser, or other feature of the electronic device 101. In other case, the user of the electronic device 101 may select multiple language types for use with keyboards, browsers, or other features of the electronic device 101, such as when the user can switch between using different virtual keyboards associated with different language types. At least one setting of the electronic device 101 can therefore be used to estimate one or more probabilities that one or more language types are being used by the user of the electronic device 101. In some embodiments, the setting(s) associated with a user's electronic device can be identified and stored in a settings database 216 for use by the device setting service 210. The device setting service 210 may return metadata that includes one or more probabilities of one or more language types based on the device setting(s).

At least some of the information associated with the request 202 is also provided by the LID service 204 to an LID engine 218. The LID engine 218 includes a spoken language identification model 220, which represents a machine learning model that has been trained to process audio data and identify the language type(s) being spoken in the audio data. The spoken language identification model 220 can be trained to recognize multiple language types, thereby allowing the same machine learning model to process multiple requests 202 involving multiple language types. In some embodiments, the spoken language identification model 220 can generate multiple probabilities as outputs for each request 202, where each probability is associated with a different language type. Thus, for instance, the spoken language identification model 220 can generate a higher probability for one language type over another language type when the spoken language identification model 220 is more certain of the language identification. The spoken language identification model 220 can also generate similar probabilities for two or more language types when the spoken language identification model 220 is less certain of the language identification.

In order to help improve the accuracy of the language identification here, the LID service 204, the LID engine 218, or other component can combine the probability generated by the spoken language identification model 220 for a request 202 with one or more probabilities generated by one or more of the services 206-210. This can result in final probabilities or scores that identify the likelihood of different language types being associated with the audio data of the request 202, and the highest score(s) representing one or more language types can be selected in order to identify the language type(s) most likely associated with the audio data of the request 202.

In some embodiments, for each request 202, the score for each of one or more language types can be determined as a weighted combination of the probabilities determined by the spoken language identification model 220 and the services 206-210. As a particular example, the weighted combination for each language type may be determined as follows.

$$y^* = \mathrm{argmax}\ \log P(y|x) + W_{loc}P_{loc}(y) + W_{speech}P_{speech}(y) + W_{text}P_{text}(y).$$

Here, $y^*$ represents the final probability or score of the associated language type. Also, $P(y|x)$ represents the probability of the associated language type as determined by the spoken language identification model 220, which means that this probability is based on acoustic features of the audio data associated with the request 202. Further, $P_{loc}(y)$ represents the probability of the associated language type based on the location associated with the person or electronic device 101 as determined by the LID service 204. In some cases, $P_{loc}(y)$ can be based on the percentage of people who speak the associated language type in a given region in which the person or the electronic device 101 is located. Moreover, $P_{speech}(y)$ represents the probability of the associated language type based on the history of spoken language types associated with the person or electronic device 101 as determined by the location service 206, and $P_{text}(y)$ represents the probability of the associated language type based on the keyboard language setting or browser language setting associated with the electronic device 101 as determined by the history service 208. In addition, $W_{loc}$, $W_{speech}$, and $W_{text}$ represent weights associated with the probabilities determined by the services 206-210. These weights can be set in any suitable manner, such as when the weights are established or adjusted during hyperparameter tuning.

Note that the three specific characteristics of the person or the electronic device 101 shown in FIG. 2 are for illustration only and can vary depending on the implementation. For example, some implementations may include one or two of these specific characteristics. Also, other implementations may include other or additional characteristics of the person or the electronic device 101. Also note that even if one or more characteristics of the person or the electronic device 101 are supported, the language identification functionality here may still operate even when the characteristic(s) of the person or the electronic device 101 are unavailable. For instance, a request 202 may lack a location of the person or the electronic device 101, or there may be no information available regarding the person or electronic device's language history or the electronic device's settings. When a subset of the services 206-210 can provide metadata regarding the request 202, the score for each language type may be based on the probability determined by the spoken language identification model 220 and the probability or probabilities determined by the subset of the services 206-210. When no services 206-210 can provide metadata regarding the request 202, the score for each language type may be based solely on the probability determined by the spoken language identification model 220.

One or more language types that are identified as being most likely associated with the request 202 can be used in any suitable manner. For example, for each request 202, the LID service 204 may provide a response 222 identifying the specific language type(s) identified as being most likely associated with the corresponding request 202. The electronic device 101 may use the identified language type(s) in any suitable manner, such as to invoke a specific machine learning model used to convert speech of a specific language type into text. Note, however, that the electronic device 101, server 106, or another component may use the one or more language types that are identified as being most likely associated with each request 202 in any other suitable manner. Various example applications (such as multilingual speech recognition models, translation applications, call routing applications, live transcription applications, and dictation and memo applications) can be supported by the electronic device 101, server 106, or other component(s) and may operate using the language identifications provided by the LID service 204.

In this particular example, the language identification functionality is provided by the server 106 based on input from a client device, namely the electronic device 101. This approach allows the server 106 to provide a personalized spoken language identification service for multiple people who speak different language types using the same trained spoken language identification model 220. As a result, the server 106 may receive requests 202 from different client devices and provide responses 222 to the client devices, even when the client devices are providing audio data in different language types. However, other implementations are also possible, such as when the language identification functionality is provided "on device," such as completely on a client device.

It should be noted that the functions shown in or described with respect to FIG. 2 can be implemented in an electronic device 101, server 106, or other device(s) in any suitable manner. For example, in some embodiments, at least some of the functions shown in or described with respect to FIG. 2 can be implemented or supported using one or more software applications or other software instructions that are executed by the processor(s) 120 of the electronic device 101, server 106, and/or other device. In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions. Also, the functions shown in or described with respect to FIG. 2 can be performed by a single device or by multiple devices.

Although FIG. 2 illustrates one example of an architecture 200 for personalized multi-modal spoken language identification, various changes may be made to FIG. 2. For example, various components in FIG. 2 can be added, omitted, combined, further subdivided, replicated, or placed in any other suitable configuration in the architecture 200 according to particular needs. Also, any other or additional service or services may be used to provide metadata associated with a request 202 for use in a weighted combination. In addition, the language identification functionality described above may be implemented in any other suitable manner, such as when implemented in other ways besides services.

FIG. 3 illustrates an example method 300 for personalized multi-modal spoken language identification in accordance with this disclosure. For ease of explanation, the method 300 of FIG. 3 is described as involving the use of the server 106 and the electronic device 101 in the network configuration 100 of FIG. 1. However, the method 300 may involve the use of any other suitable device(s) in any other suitable system(s).

As shown in FIG. 3, a request to identify at least one language type being spoken is received at step 302. This may include, for example, the processor 120 of the server 106 receiving a request 202 containing audio data of a person speaking captured by an electronic device 101. The request 202 may also include metadata associated with the person or the electronic device 101. Probabilities that the person is speaking in different language types are generated based on the audio data at step 304. This may include, for example, the processor 120 of the server 106 providing the audio data to the trained spoken language identification model 220, which can generate probabilities that the audio data contains speech in different language types.

A determination is made whether a location is to be used to assist in the language identification at step 306. This may include, for example, the processor 120 of the server 106 determining whether a real-time location of the person speaking or the electronic device 101 is available, such as whether the real-time location was contained in the request 202. If so, probabilities that the person is speaking in different language types are generated based on the real-time location at step 308. This may include, for example, the processor 120 of the server 106 using the location service 206 to access the geo-language database 212 and identify statistics or other information regarding spoken language types in the city, state/province, country, or other region that includes the real-time location of the person speaking or the electronic device 101. This may also include the location service 206 returning metadata identifying one or more language types and a probability of each language type. The probability of each language type can represent or be based on the statistics or other information from the geo-language database 212.

A determination is made whether a language type history is to be used to assist in the language identification at step 310. This may include, for example, the processor 120 of the server 106 determining whether any prior language types are associated with the person speaking or the electronic device 101. If so, probabilities that the person is speaking in different language types are generated based on the language type history at step 312. This may include, for example, the processor 120 of the server 106 using the history service 208 to identify any prior language types associated with the person speaking or the electronic device 101 and a probability that the request 202 is associated with each of those prior language types. As a particular example, this may include the processor 120 of the server 106 using a model that has been trained based on Mel frequency cepstral coefficients, linear prediction cepstral coefficients, wavelet octave coefficients of residues, or a combination thereof, where the model can generate different probabilities that a person is speaking in different language types. This may also include the history service 208 returning metadata identifying one or more language types and a probability of each language type.

A determination is made whether at least one device setting is to be used to assist in the language identification at step 314. This may include, for example, the processor 120 of the server 106 determining whether any language settings associated with the electronic device 101 are available. If so, probabilities that the person is speaking in different language types are generated based on the at least one device setting at step 316. This may include, for example, the processor 120 of the server 106 using the device setting service 210 to identify whether the electronic device 101 is associated with one or more keyboard language settings, browser language settings, or other language settings associated with one or more language types. This may also include the device setting service 210 returning metadata identifying one or more language types and a probability of each language type.

Scores for the language types are generated based on the probabilities at step 318. This may include, for example, the processor 120 of the server 106 generating scores as weighed combinations of the probabilities from the spoken language identification model 220 and the probabilities from the services 206-210. At least one language type associated with the request is identified at step 320. This may include, for example, the processor 120 of the server 106 identifying the language type(s) associated with the highest score(s) and using that as the identification of the spoken language type(s) in the audio data. The identified language type(s) can be stored, output, or used in some manner at step 322. This may include, for example, the processor 120 of the server 106 providing a response 222 to the electronic device 101 that identifies the language type(s) associated with the highest score(s). This allows the electronic device 101 to display the identified language type(s) or otherwise use the identified language type(s), such as to invoke one or more functions based on the language type(s) being spoken. This may also or alternatively include the processor 120 of the server 106 or another component using the identified language type(s) to invoke one or more functions based on the language type(s) being spoken.

Although FIG. 3 illustrates one example of a method 300 for personalized multi-modal spoken language identification, various changes may be made to FIG. 3. For example, while shown as a series of steps, various steps in FIG. 3 may overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method performed by a first electronic device, the method comprising:
obtaining, from a second electronic device, an audio input of a person speaking and metadata available at the second electronic device, the audio input captured by the second electronic device, the metadata including at least one of:
a history of spoken language types associated with the person or the second electronic device; and
a keyboard language setting or a browser language setting associated with the second electronic device;
for each of multiple language types:
determining a first probability that the person is speaking in the language type by applying a trained spoken language identification model to the audio input;
determining at least one second probability that the person is speaking in the language type based on the metadata available at the second electronic device; and
determining a score for the language type based on a weighted sum of the first and second probabilities; and
identifying the language type associated with a highest score as a spoken language of the person in the audio input.

2. The method of claim 1, wherein, for each of the language types, the at least one second probability comprises at least two of:
a probability of the person speaking in the language type based on a location associated with the person or the second electronic device;
a probability of the person speaking in the language type based on the history of spoken language types associated with the person or the second electronic device; and
a probability of the person speaking in the language type based on the keyboard language setting or the browser language setting associated with the second electronic device.

3. The method of claim 1, wherein, for each of the language types, the at least one second probability comprises:
a probability of the person speaking in the language type based on a location associated with the person or the second electronic device;
a probability of the person speaking in the language type based on the history of spoken language types associated with the person or the second electronic device; and
a probability of the person speaking in the language type based on the keyboard language setting or the browser language setting associated with the second electronic device.

4. The method of claim 3, wherein the history of spoken language types associated with the person includes a model trained using at least one of:
Mel frequency cepstral coefficients;
linear prediction cepstral coefficients representing vocal cord movements; and
wavelet octave coefficients of residues representing pitch, harmonic structure, and spectral energy distribution.

5. The method of claim 3, wherein the metadata further includes the location associated with the person or the second electronic device.

6. The method of claim 1, wherein the first electronic device provides a personalized spoken language identification service for multiple people who speak different language types using the trained spoken language identification model.

7. A method comprising:
obtaining an audio input of a person speaking, the audio input captured by an electronic device;
for each of multiple language types:
  determining a first probability that the person is speaking in the language type by applying a trained spoken language identification model to the audio input;
  determining at least one second probability that the person is speaking in the language type based on at least one characteristic of the person or the electronic device; and
  determining a score for the language type based on a weighted sum of the first and second probabilities; and
identifying the language type associated with a highest score as a spoken language of the person in the audio input;
wherein, for each of the language types, the at least one second probability comprises:
  a probability of the person speaking in the language type based on a location associated with the person or the electronic device;
  a probability of the person speaking in the language type based on a history of spoken language types associated with the person or the electronic device; and
  a probability of the person speaking in the language type based on a keyboard language setting or a browser language setting associated with the electronic device; and
wherein, for each of the language types, determining the score for the language type comprises using a formula of:

$$y^* = \text{argmax} \log P(y|x) + W_{loc}P_{loc}(y) + W_{speech}P_{speech}(y) + W_{text}P_{text}(y),$$

where:
  $y^*$ represents the score;
  $P(y|x)$ represents the first probability;
  $P_{loc}(y)$ represents the probability based on the location associated with the person;
  $P_{speech}(y)$ represents the probability based on the history of spoken language types associated with the person;
  $P_{text}(y)$ represents the probability based on the keyboard language setting or the browser language setting associated with the electronic device; and
  $W_{loc}$, $W_{speech}$, and $W_{text}$ represent weights.

8. An apparatus comprising:
at least one processing device configured to:
  obtain, from an electronic device, an audio input of a person speaking captured by the electronic device and metadata available at the electronic device, the metadata including at least one of:
    a history of spoken language types associated with the person or the electronic device; and
    a keyboard language setting or a browser language setting associated with the electronic device;
  for each of multiple language types:
    determine a first probability that the person is speaking in the language type by applying a trained spoken language identification model to the audio input;
    determine at least one second probability that the person is speaking in the language type based on the metadata available at the electronic device; and
    determine a score for the language type based on a weighted sum of the first and second probabilities; and
  identify the language type associated with a highest score as a spoken language of the person in the audio input.

9. The apparatus of claim 8, wherein, for each of the language types, the at least one second probability comprises at least two of:
  a probability of the person speaking in the language type based on a location associated with the person or the electronic device;
  a probability of the person speaking in the language type based on the history of spoken language types associated with the person or the electronic device; and
  a probability of the person speaking in the language type based on the keyboard language setting or the browser language setting associated with the electronic device.

10. The apparatus of claim 8, wherein, for each of the language types, the at least one second probability comprises:
  a probability of the person speaking in the language type based on a location associated with the person or the electronic device;
  a probability of the person speaking in the language type based on the history of spoken language types associated with the person or the electronic device; and
  a probability of the person speaking in the language type based on the keyboard language setting or the browser language setting associated with the electronic device.

11. The apparatus of claim 10, wherein, for each of the language types, the score for the language type is based on a formula of:

$$y^* = \text{argmax} \log P(y|x) + W_{loc}P_{loc}(y) + W_{speech}P_{speech}(y) + W_{text}P_{text}(y),$$

where:
  $y^*$ represents the score;
  $P(y|x)$ represents the first probability;
  $P_{loc}(y)$ represents the probability based on the location associated with the person;
  $P_{speech}(y)$ represents the probability based on the history of spoken language types associated with the person;
  $P_{text}(y)$ represents the probability based on the keyboard language setting or the browser language setting associated with the electronic device; and
  $W_{loc}$, $W_{speech}$, and $W_{text}$ represent weights.

12. The apparatus of claim 10, wherein the history of spoken language types associated with the person includes a model trained using at least one of:
  Mel frequency cepstral coefficients;
  linear prediction cepstral coefficients representing vocal cord movements; and
  wavelet octave coefficients of residues representing pitch, harmonic structure, and spectral energy distribution.

13. The apparatus of claim 10, wherein the metadata further includes the location associated with the person or the electronic device.

14. The apparatus of claim 8, wherein the at least one processing device is configured to provide a personalized spoken language identification service for multiple people who speak different language types using the trained spoken language identification model.

15. A non-transitory computer readable medium containing instructions that when executed cause at least one processor to:

obtain, from an electronic device, an audio input of a person speaking captured by the electronic device and metadata available at the electronic device, the metadata including at least one of:
- a history of spoken language types associated with the person or the electronic device; and
- a keyboard language setting or a browser language setting associated with the electronic device;

for each of multiple language types:
- determine a first probability that the person is speaking in the language type by applying a trained spoken language identification model to the audio input;
- determine at least one second probability that the person is speaking in the language type based on the metadata available at the electronic device; and
- determine a score for the language type based on a weighted sum of the first and second probabilities; and identify the language type associated with a highest score as a spoken language of the person in the audio input.

16. The non-transitory computer readable medium of claim 15, wherein, for each of the language types, the at least one second probability comprises at least two of:
- a probability of the person speaking in the language type based on a location associated with the person or the electronic device;
- a probability of the person speaking in the language type based on the history of spoken language types associated with the person or the electronic device; and
- a probability of the person speaking in the language type based on the keyboard language setting or the browser language setting associated with the electronic device.

17. The non-transitory computer readable medium of claim 15, wherein, for each of the language types, the at least one second probability comprises:
- a probability of the person speaking in the language type based on a location associated with the person or the electronic device;
- a probability of the person speaking in the language type based on the history of spoken language types associated with the person or the electronic device; and
- a probability of the person speaking in the language type based on the keyboard language setting or the browser language setting associated with the electronic device.

18. The non-transitory computer readable medium of claim 17, wherein, for each of the language types, the score for the language type is based on a formula of:

$$y^* = \mathrm{argmax}\ \log P(y|x) + W_{loc}P_{loc}(y) + W_{speech}P_{speech}(y) + W_{text}P_{text}(y),$$

where:
- $y^*$ represents the score;
- $P(y|x)$ represents the first probability;
- $P_{loc}(y)$ represents the probability based on the location associated with the person;
- $P_{speech}(y)$ represents the probability based on the history of spoken language types associated with the person;
- $P_{text}(y)$ represents the probability based on the keyboard language setting or the browser language setting associated with the electronic device; and
- $W_{loc}$, $W_{speech}$, and $W_{text}$ represent weights.

19. The non-transitory computer readable medium of claim 17, wherein the history of spoken language types associated with the person includes a model trained using at least one of:
- Mel frequency cepstral coefficients;
- linear prediction cepstral coefficients representing vocal cord movements; and
- wavelet octave coefficients of residues representing pitch, harmonic structure, and spectral energy distribution.

20. The non-transitory computer readable medium of claim 15, further containing instructions that when executed cause the at least one processor to provide a personalized spoken language identification service for multiple people who speak different language types using the trained spoken language identification model.

* * * * *